Mar. 20, 1923.
L. H. BALWICK
FRUIT GRADER
Filed Aug. 7, 1922
1,448,990
2 sheets-sheet 2
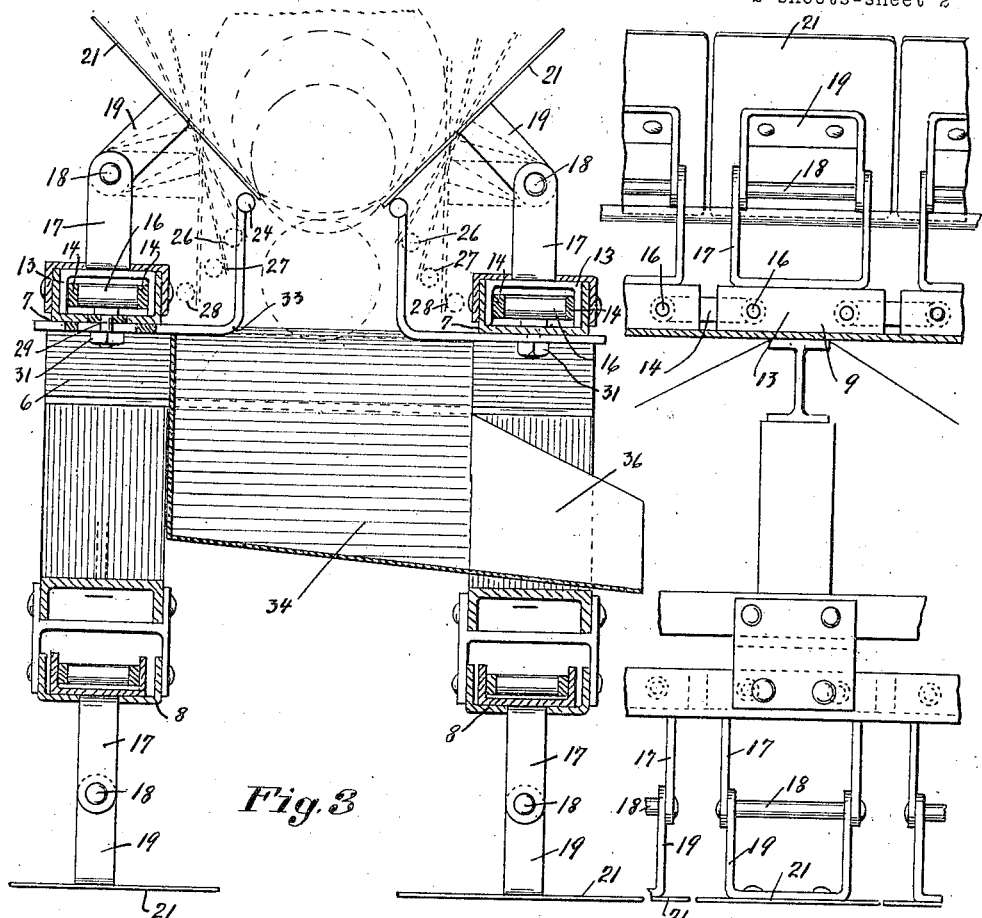
Fig.3  Fig.6.  Fig.4.
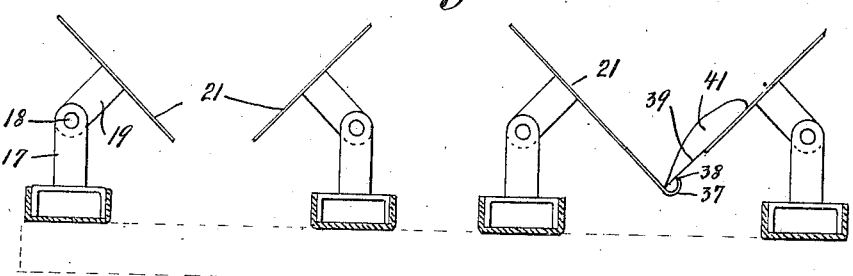
Fig.5.
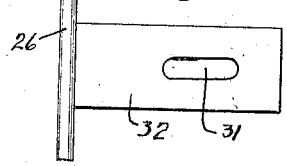
Inventor.
L. H. Balwick
By
Attorneys Patented Mar. 20, 1923.

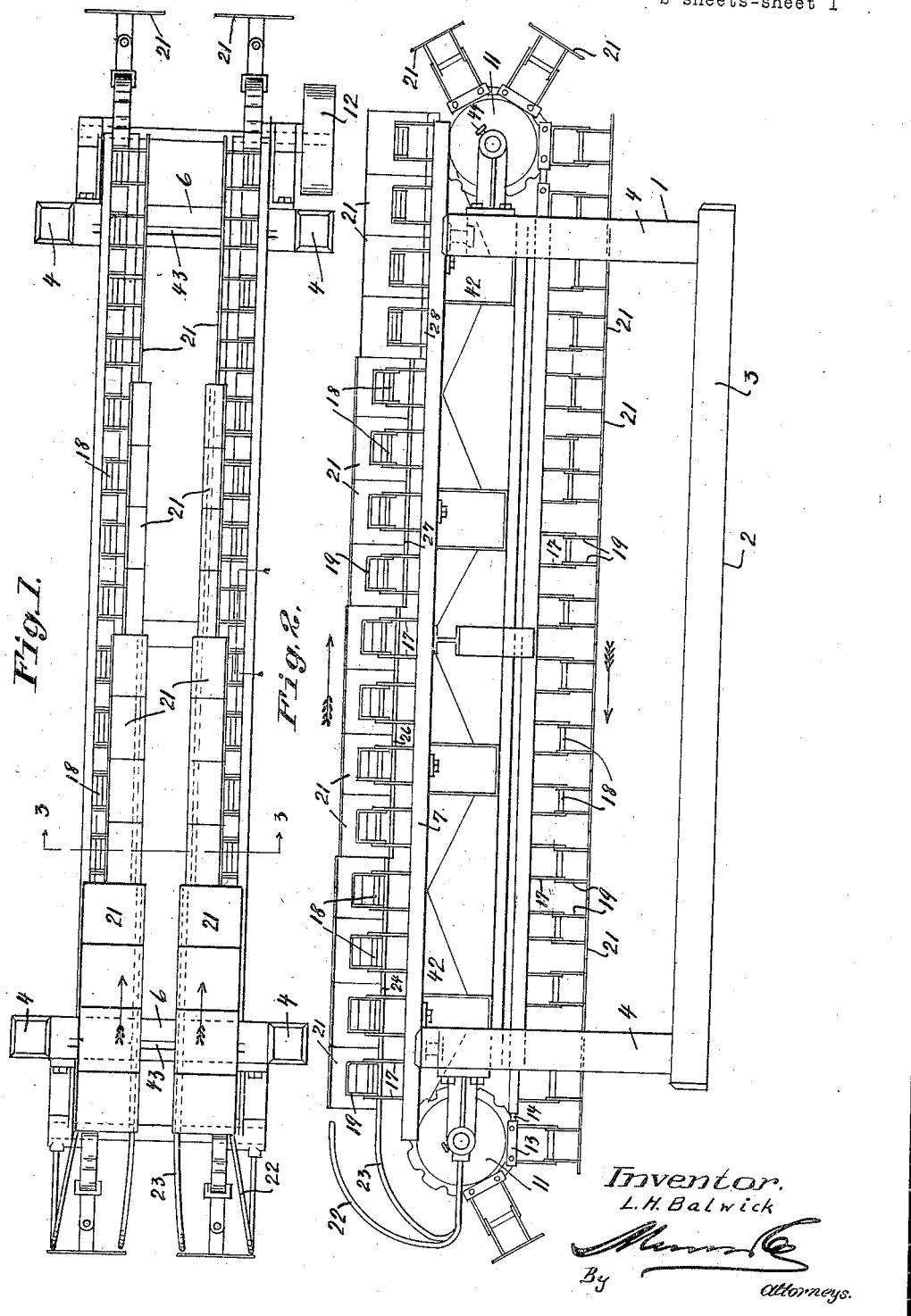

1,448,990

UNITED STATES PATENT OFFICE.

LOUIS H. BALWICK, OF OAKLAND, CALIFORNIA.

FRUIT GRADER.

Application filed August 7, 1922. Serial No. 580,177.

*To all whom it may concern:*

Be it known that I, LOUIS H. BALWICK, a citizen of the United States, and a resident of Oakland, county of Alameda, and State of California, have invented a new and useful Fruit Grader, of which the following is a specification.

The present invention relates to improvements in graders for fruit and the like and its particular object is to provide a continuous grader of large capacity for a comparatively small size of grader. A further object of the invention is to provide a grader of the character described that will handle cut fruit, as for instance, cut peaches or pears as effectively as whole fruit. A further object of the invention is to provide a grader that will not damage in any way the fruit during the grading operations, that will be durable and capable of fine adjustment so that one machine will serve for the grading of practically all kinds of fruit, only slight adjustments being necessary to change from one fruit to a different kind.

The preferred form of my grader is illustrated in the accompanying drawings in which Figure 1 shows a top plan view of my grader, Figure 2 a side elevation of the same, Figure 3 a vertical cross-section through the same substantially along line 3—3 of Figure 1, Figure 4 a longitudinal section through a small portion of the same substantially along line 4—4 of Figure 1. Figure 5 a detail view of an adjustable rod and Figure 6 a schematic view of a double arrangement of two grading devices on one frame. While I have shown only the preferred form of the invention I wish to have it understood that various changes or modifications may be made within the scope of the claims hereto attached without departing from the spirit of the invention.

My grader (1) is preferably supported on a wooden frame (2) comprising a base (3) four posts (4) and transverse top members (6). On the latter are supported two channels (7) in parallel and spaced relation which form in co-operation with the parallel channels (8) supported underneath the frame the guideway for an endless chain (9) engaged at either end of the device by a sprocket wheel (11) one of which is rotated preferably by means of a pulley (12). The chain which is shown in detail in the Figures 3 and 4 consists of pieces (13) of channel iron pivotally connected by short links (14) of any suitable design by means of pins (16). The short pieces (13) the flanges of which ride on the guide wheels on top of the frame are provided with U shaped members (17) secured to their backs which latter support on pins (18) extending between their legs other U shaped members (19) to which plates (21) are secured. These plates are adapted thereby to swing through the members (19) on the pins (18) and while the chain is travelling underneath the frame the plates will necessarily occupy a horizontal position as shown in Figures 3 and 4. Assuming the direction of motion to be in the direction of the arrows shown in Figures 1 and 2 the plates will be engaged when ascending on the sprocket wheels (11) by two guide members (22 and 23), the outer one (22) being higher than the inner one (23) so that the plates are tilted by the guide members into a position corresponding substantially to that shown in Figure 3. As will be seen from this figure two opposing plates (21) of the two chains are slanting downwardly toward each other so as to be adapted to give lateral support to the fruit passed over the same but so as to leave a gap which need only be widened to allow the fruit to pass through. The guide member (23) runs into the guide rod (24) which substantially maintains the plates in their respective positions. After passing over the rod (24) the plates are engaged by another rod (26) which recedes further from the center of the device and allows the plate to fall down further and to widen the gap between the plates. Other rods (27 and 28) are provided to step-wise recede from the center line and to thereby step-wise increase the width of the gap between the plates. The rods (26) are adjustably secured to the main guides (7) by any suitable means, as for instance, by the bolts (29) engaging slots (31) in the plates (32) which latter are bent as shown at (33).

It will be readily understood that fruit dropped between the plates at one end, that is at the left hand side in Figure 1 will be forwarded by the chains or plates until the gap between the plates has widened sufficiently to allow the fruit to drop when the same will be received in a suitable box (34) and discharged through an opening (36).

The advantage of my device will be readily understood from the foregoing description. The rods (24) etc. can be readily adjusted to any width of gap desired so that it is only a matter of a few minutes to adapt the device for a different kind of fruit. Since the increase of the width in the gap is produced step-wise the fruit will not be damaged during the grading operation. The latter may be carried on continuously. The device is simple in construction and durable.

Figure 6 shows the ease with which two apparatus of the same kind can be mounted on one frame and worked simultaneously. It further shows a slightly modified form of plate which is particularly adapted to be used for the handling of cut fruit as shown in this modification. One of the plates is considerbly longer than the other one and terminates in a curve (37) the point (38) of which is adapted to engage the under side (39) of a pear (41) or other fruit and to hold the same until the gap between two opposing plates becomes large enough to allow the pear to fall through. If constructed in this manner the cut fruit will not fall through the gap until the same has obtained a width corresponding to the length of the fruit, assuming of course that the fruit is placed on the plates in the correct position, which is done by means of a feeding device not shown in the present application.

The two main guides (7 and 8) as well as the sprocket wheels (11) are adjustably secured to their respective supports so that the distance between the two chains can be readily adjusted irrespective of the final adjustments to be brought about by means of the rods (24, 26, 27, etc.). The adjustments of this character may be brought about as far as the guide channels are concerned by means of bolts (42), engaging slots (43) in the frame member and as far as the sprocket wheels are concerned by means of suitable set screws (44).

I claim:

1. In a fruit grader of the character described, a pair of plates having legs extending from their central portions pivotally mounted on parallel shafts adapted to be tilted toward each other for forming lateral supports for the fruit to be graded and a horizontal bar for each plate engaging its lower edge portion for supporting the same at a desired angle.

2. In a fruit grader of the character described, a pair of plates having legs extending from their central portions pivotally mounted on parallel shafts adapted to be tilted toward each other for forming lateral supports for the fruit to be graded and a laterally adjustable horizontal bar for each plate engaging its lower edge portion for supporting the same at a desired angle.

3. In a fruit grader of the character described, two chains of plates pivotally mounted on parallel shafts adapted to be tilted toward each other for forming lateral supports for the fruit to be graded, means for imparting motion to the chains, and means for supporting the plates at varying angles.

4. In a fruit grader of the character described, two chains of plates pivotally mounted on parallel shafts adapted to be tilted toward each other for forming lateral supports for the fruit to be graded, means for imparting motion to the chains, and stationary supports for the plates slidingly engaging their lower edge portions.

5. In a fruit grader of the character described, two chains of plates pivotally mounted on parallel shafts adapted to be tilted toward each other for forming lateral supports for the fruit to be graded, means for imparting motion to the chains, and stationary supports for the plates slidingly engaging their lower edge portions, and receding stepwise from the center of the device so as to increase the gap between the plates.

6. In a fruit grader of the character described, a frame, two parallel guide ways thereon, two endless chains, means for moving the same over the guide ways, plates associated with said chains pivotally supported on longitudinal shafts adapted to be tilted toward each other for forming lateral supports for the fruit to be graded and stationary means engaging the lower edge portions of the plates for supporting the same.

7. In a fruit grader of the character described, a frame, two parallel guide ways thereon, two endless chains, means for moving the same over the guide ways, plates associated with said chains pivotally supported on longitudinal shafts adapted to be tilted toward each other for forming lateral supports for the fruit to be graded and a succession of laterally adjustable horizontal bars for each row of plates slidably engaging their lower edge portions for supporting the same at desired angles.

8. In a fruit grader of the character described, a frame two parallel guide ways thereon, two endless chains, means for moving the same over the guide ways, plates associated with said chains pivotally supported on longitudinal shafts adapted to be tilted toward each other for forming lateral supports for the fruit to be graded and a succession of laterally adjustable horizontal bars for each row of plates slidably engaging their lower edge portions for supporting the same at desired angles, and receding stepwise from the center of the device so as to increase the gap between the plates.

LOUIS H. BALWICK.